Feb. 21, 1967 G. E. MITCHELL 3,305,722
ELECTRIC MOTOR STARTER CIRCUIT
Filed Sept. 12, 1963
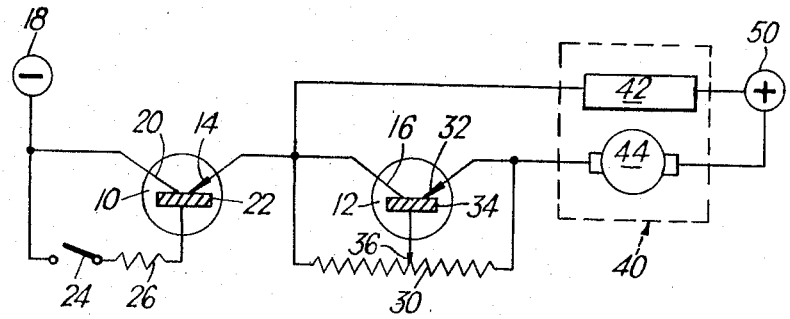
Inventor
GEORGE EDWARD MITCHELL
By Albert H. Reuther
Attorney

United States Patent Office 3,305,722
Patented Feb. 21, 1967

3,305,722
ELECTRIC MOTOR STARTER CIRCUIT
George Edward Mitchell, Kingsbury, England, assignor to General Motors Corporation, Detroit, Mich., a corporation of Delaware
Filed Sept. 12, 1963, Ser. No. 308,415
6 Claims. (Cl. 318—390)

This invention relates to electric motor starter circuits.

An electric motor starter circuit, according to the invention, comprises a current switch transistor, a current control transistor in series with the switch transistor, and a resistor in parallel with the control transistor and connected to its base to provide a bias which decreases in relation to the control transistor collector voltage as motor speed increases.

Preferably, the resistor is connected to the base of the control transistor by means of a variable tap.

The circuit is applicable to the control of a motor having a field winding and an armature winding, the armature winding being connected at one end to the control transistor emitter and the field winding being connected at one end to the control transistor collector and in parallel with the control transistor and the armature winding.

The scope of the invention is defined by the appended claims; and how it can be performed is hereinafter particularly described with reference to the accompanying drawing which is a diagram of an electric motor start circuit in combination with an electric motor according to the invention.

In the circuit shown in the drawing, a current switch transistor 10 and a current control transistor 12 are connected in series, that is, the emitter 14 of the first is connected to the collector 16 of the second. A negative electric current supply terminal 18 is connected to the collector 20 of the switch transistor 10 and is also connected to its base 22 through a starter switch 24 and a bias resistor 26.

A current limiter resistor 30 is connected in parallel with the current control transistor 12 between its collector 16 and its emitter 32. The base 34 of the control transistor 12 is connected to a tap 36 on the resistor 30. The tap 36 is variable so that the bias on the control transistor 12 can be set.

A motor 40 having a field winding 42 and an armature winding 44 is connected to the control transistor 12 as follows. One end of the field winding 42 is connected to the collector 16 and one end of the armature winding 44 is connected to the emitter 32. The other ends of the windings are both connected to a positive current supply terminal 50. Thus, the armature winding 44 is in series with the control transistor 12 and the field winding 42 is in parallel with both the transistor 12 and the armature winding 44.

The circuit operates as follows. When the starter switch 24 is closed, a voltage the same as that of the collector 20 is applied to the base 22 of the switch transistor 10, which passes the maximum motor starting current to the field winding 42. However, the armature current is limited because the current control transistor 12 is initially biased so as to be only partially conductive and the voltage across the current limiter resistance 30 is say ⅘ths of the supply voltage.

As the motor 40 increases speed, the voltage across the limiter resistor 30 decreases and the potential at the tap 36 on the resistance 30 becomes nearer in value to that on the collector 16 of the control transistor. The transistor thus becomes increasingly conductive and the voltage across the resistor 30 falls to about 1 volt. The full supply voltage (less about 1 volt) is now applied across the armature winding 44 and the motor 40 runs at full speed. The control transistor 12 under these conditions is fully conductive and the effective resistance of the limiter resistor 30 is reduced to about ½ of its true value. The limiter resistor 30 becomes, under these conditions, the base resistor for the control transistor 12.

The circuit just described above is particularly suitable for use in a motor vehicle such as an ice-cream van, the electric motor being the refrigerant compressor motor. The circuit can advantageously replace a conventional mechanical relay starter circuit in such a vehicle where vibration can cause spurious operation of the relay controlling the current limiter resistor at the instant when refrigeration requirements dictate a start of the motor. If the starter switch closes when, because of spurious relay operation, the limiter resistance is cut out, the full supply voltage would immediately be applied to the armature and result in damage to the winding.

The circuit may be slightly modified by the inclusion of a thermo-responsive overload protection switch in series with the negative supply terminal.

The circuit described above uses p-n-p type transistors. They could be replaced by n-p-n type transistors and then the voltage supply terminals would be reversed on polarity.

I claim:

1. An electric motor start circuit, comprising, a motor armature and field winding means, a current switch transistor in series at least with said field winding means, a current control transistor in series with the switch transistor and said motor armature only, and a resistor in parallel with only the control transistor, said resistor being tap connected to control transistor base to provide a bias which decreases in relation to the control transistor collector voltage as motor speed increases.

2. An electric motor start circuit, comprising, a motor armature and field winding means, a current switch transistor in series at least with said field winding means, a current control transistor in series with the switch transistor and said motor armature only, and a resistor in parallel with only the control transistor said resistor being connected to control transistor base by means of a variable tap that provides a bias which decreases in the relation to the control transistor collector voltage as motor speed increases.

3. A start circuit for an electric motor having a field winding and an armature winding, the circuit comprising, a current switch transistor as well as a current control transistor each having an emitter, collector and base, said current switch transistor having emitter thereof connected in series with collector of said current control transistor, said current control transistor having emitter thereof connected in series with the armature winding, starter switch means in s series connection with base of said current switch transistor to control said switch transistor, and resistance means connected in parallel with the control transistor and connected to said control transistor base thereby providing a bias voltage which decreases in relation to the control transistor collector voltage as motor speed increases, the motor field winding being connected in parallel with collective series interconnection of the control transistor and the armature winding.

4. A start circuit for an electric motor having a field winding and an armature winding, the circuit comprising, a current switch transistor as well as a current control transistor each having an emitter, collector and base, a current control transistor having collector thereof connected to said switch transistor emitter and having control transistor emitter connected to one end of said armature winding, starter switch means in series connection with base of said current switch transistor to control said switch transistor, and resistance means connected in parallel with the control transistor and connected to said control transistor base thereby providing a bias voltage which decreases in relation to the control transistor collector voltage as motor speed increases, the motor field winding being connected in parallel with series interconnection of the control transistor and the motor armature winding.

5. A start circuit as in claim 4, in which said resistance means is connected to the base of the control transistor by a variable tap.

6. A start circuit for an electric motor having a field winding and an armature winding, the circuit comprising, a first supply line to which one end of each motor winding is connected, a second supply line, a current switch transistor having an emitter, collector and base, bias resistance means and starter switch means series connected to each other between said second supply line and said switch transistor base, a current control transistor having an emitter, collector and base, and having control transistor collector connected to said switch transistor emitter as well as having control transistor collector connected to the end of said motor field winding at a location remote from said first supply line and having control transistor emitter connected to the end of said motor armature winding at a location remote from said first supply line, resistance means connected between said control transistor collector and emitter, and a variable tap connection to said resistance means connected to said control transistor base thereby providing a bias voltage which decreases in relation to the control transistor collector voltage as motor speed increases.

References Cited by the Examiner

UNITED STATES PATENTS

| | | | |
|---|---|---|---|
| 2,975,349 | 3/1961 | Green | 318—331 |
| 2,981,879 | 4/1961 | Taylor et al. | 318—331 X |
| 3,022,454 | 2/1962 | Millis. | |
| 3,038,110 | 6/1962 | Paist. | |
| 3,084,319 | 4/1963 | Hooijkamp | 318—345 |

ORIS L. RADER, *Primary Examiner.*

G. SIMMONS, *Assistant Examiner.*